United States Patent

[11] 3,614,063

| [72] | Inventor | Jean Gachot<br>179 Avenue de la Division Leclerc, 95<br>Enghien (Val d'Oise), France |
|---|---|---|
| [21] | Appl. No. | 878,055 |
| [22] | Filed | Nov. 19, 1969 |
| [45] | Patented | Oct. 19, 1971 |
| [32] | Priority | Nov. 26, 1968 |
| [33] | | France |
| [31] | | PV 175,338 |

[54] COCK WITH A ROTATABLE PLUG
5 Claims, 5 Drawing Figs.

[52] U.S. Cl. .................................................. 251/355
[51] Int. Cl. .................................................. F16k 41/02
[50] Field of Search .......................................... 251/214,
355, 315, 312, 309

[56] References Cited
UNITED STATES PATENTS

| 2,961,214 | 11/1960 | Freed .......................... | 251/309 |
| 3,176,713 | 4/1965 | McDermott et al. ......... | 251/368 X |
| 3,206,530 | 9/1965 | Boteler ........................ | 251/368 X |
| 3,334,650 | 8/1967 | Lowrey et al. ............... | 251/315 X |
| 3,425,663 | 2/1969 | Priese .......................... | 251/214 X |
| 3,458,172 | 7/1969 | Burrows ...................... | 251/214 X |

*Primary Examiner*—Samuel Scott
*Attorney*—Young & Thompson

ABSTRACT: A cock comprising a body, a rotatable plug accommodated within said body, a rotatable stem passing through the wall of said body to control the angular position of said plug, said stem including an enlarged portion defining a bearing surface engageable with a seating defined by an aperture in the body wall, a tightening flange to urge said bearing surface into sealing engagement with said seating, said bearing surface having a circular cross section which decreases towards the outside of said body and being coated with a self-lubricating sealing material.

The stem is provided with an annular projection located outside of the body and the tightening flange is located between the body and the annular projection and bears on the latter. This arrangement affords improved fluidtightness and safe operation at high pressures.

INVENTOR
JEAN GACHOT
By Young + Thompson
ATTYS.

INVENTOR
JEAN GACHOT
BY Young & Thompson
ATTYS

COCK WITH A ROTATABLE PLUG

In my copending application Ser. No. 680,822 filed on Nov. 6, 1967 and now abandoned, I have described a cock comprising a body in which there is accommodated a rotatable plug, and a shaft for controlling the angular position of the plug, which shaft passes through a wall of the body and has an enlarged portion comprising a bearing surface of right circular section which is urged into sealing engagement with a seating in the wall of the body by means of a tightening device. The enlarged portion of the shaft is coated with a self-lubricating sealing material, such as polytetrafluorethylene or polytrifluorethylene. The enlarged portion of the shaft comprises a second bearing surface situated outwardly of the first one in relation to the body.

While this cock operates generally in a satisfactory manner, I have noticed that in severe operation conditions, the pressure inside the cock tends to urge the stem toward the outside of the body. It is therefore necessary to firmly tighten the tightening flange on the second bearing surface of the stem, especially where high pressures are involved. Such tightening develops a comparatively higher stress on the bearing surface.

U.S. Pat. No. 1,043,065 discloses a valve including a rotatable plug and a control stem, in which the control stem passes through a stuffing box and comprises an enlarged portion with bearing surfaces. Such a valve would not satisfactorily operate at high or low temperatures in the order of +400° C. or −250° C. and at high fluid pressures, since a jamming of the stem would occur and the fluid tightness would be impaired.

An object of this invention is to obviate the aforecited drawbacks by providing a cock which operates in a satisfactory manner at high pressures and temperature extremes of up to +400° C. and −250° C.

According to the invention, there is provided a cock comprising a body having a chamber therein, a rotatable plug accommodated within the chamber and having a passageway therethrough, means for rotating the plug in the chamber, said means comprising a stem passing through an aperture in the wall of said body to control the angular position of said plug, said stem including an enlarged portion defining a bearing surface engageable with a seating defined by said aperture in the body wall, tightening means to urge said bearing surface into sealing engagement with said seating, said bearing surface having a circular cross section which decreases towards the outside of said body and being coated with a self-lubricating sealing material.

This arrangement insures that the pressure inside the cock will apply the enlarged portion of the stem onto its seating while materially increasing fluidtightness.

In accordance with an advantageous embodiment, said control stem is provided with an annular projection located outside of said body and said tightening means is a flange located between said body and said annular projection and bearing on the latter, tightening means being further provided for holding the flange in spaced relationship with respect to said body.

This feature allows a positive application of the enlarged portion of the stem on its seating.

Other features and advantages of the invention will appear from the following description, with reference to the accompanying drawings, in which.

Figure 1:
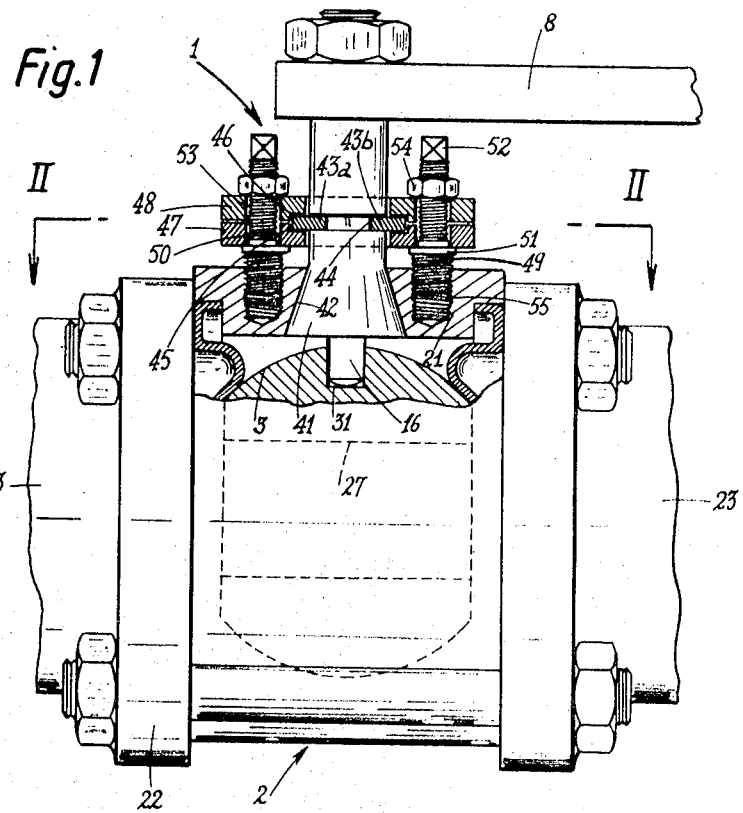
FIG. 1 is a view in partial axial section of a first embodiment of a cock according to the invention.
Figure 2:
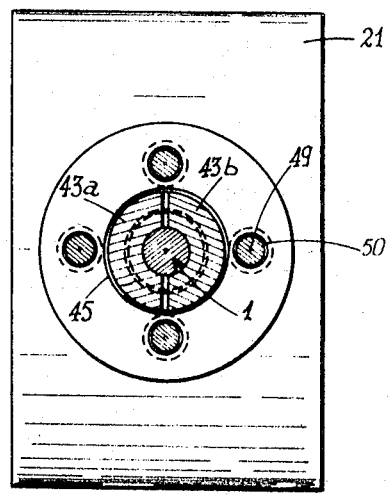
FIG. 2 is a view in section on line II—II of FIG. 1.

Referring to FIGS. 1 and 2, there is shown a cock 2 comprising a body 21 mounted between two flanges 22 of pipe couplings 23. Within the body 21 is accommodated a rotatable plug in the form of a ball 3 having a diametral passage 27. A shaft 1 for transmitting rotational movement to the ball 3 from a handle 8 is formed in one piece and includes a driving lug 16 accommodated in a groove 31 in the ball 3.

The shaft 1 is formed from a metal having a coefficient of expansion very near that of the metal from which the body 21 of the cock 2 is made, the metal preferably being stainless steel.

The portion of the control shaft which passes through an aperture in the body wall is enlarged so as to define a revolution surface 41 the circular cross section of which decreases from the inside toward the outside of the body 21. In the embodiment of FIGS. 1 and 2, the enlarged portion 41 of the shaft 1 is frustoconical. A seating 42 for this enlarged portion 41 of shaft 1 is defined by the aperture in the body wall.

On the outside of the body 21 the control shaft 1 is provided with an annular projection in the form of a friction washer constituted by two parts 43a and 43b (FIG. 2). These two parts 43a, 43b are adapted in a peripheral groove 44 in the shaft 1. The external projecting edges of the washer are accommodated with a slight play in annular recesses 45, 46 provided in a tightening flange 47 and in a counterflange 48 respectively. These flanges encircle the shaft 1 and bear against each other.

Adjustable studs 49 are screwed at one end into bores 55 in the body 21 and extend freely through drillings 50 and 53 respectively provided in flanges 47 and 48. Each stud 49 is formed with a ledge 51 on which the flange 47 bears and is provided with an angular end 52. Nuts 54 are screwed onto studs 49 and urge the counterflange 48 toward the flange 47.

The enlarged portion 41 of the shaft 1 is provided with a coating of polytetrafluoroethylene filled with powdered material selected from colloidal graphite, silica, glass and bronze. The powdered material is added in the amount of: 15–21 percent, preferably 18 percent for colloidal graphite, with a size of the particles in the range of 2–5 $\mu$; 12–18 percent, preferably 15 percent, for glass and silica, with a particle size in the range of 30–40 $\mu$; 25–35 percent, preferably 30 percent, for bronze, with a particle size in the range of 30–45 $\mu$. The coating has a thickness in the range of 2/100 to 1/10 mm., for example, and preferably, of 4/100 mm. The friction washer 43a, 43b may also be coated. Alternatively a coating of another material resistant to high and low pressures and temperatures can be applied, such as polytrifluroethylene.

Polytetrafluoroethylene filled as previously stated is preferred because the low friction property of polytetrafluoroethylene is maintained while the resistance properties are materially increased.

For example, the torque applied for operating the cock was found to be 10 percent higher only; as compared with a similar cock having a coating of pure polytetrafluoroethylene, while the number of maneuvers before failure was found to reach 3,500 instead of 500 with said similar cock. Such a result is of notable importance and constitutes a substantial improvement over conventional cock structures.

Mounting of the cock is effected as follows. The studs 49 are first screwed into the body 21. The flange 47 and the washer 43a, 43b being in position, unscrewing of the studs 49 causes the flange 47 which bears on the ledges 51 to move away from the body 21.

The flange 47 engages the washer 43a, 43b and urges the shaft 1 until the enlarged portion 41 bears onto the seating 42. When the pressure applied on the seating is deemed suitable, the counterflange 48 is placed and locked on the flange 47 by means of studs 54. The handle 8 is ultimately secured to the shaft 1.

The fluid pressure within the body 21 tends to apply the enlarged portion 41 of the shaft against its seating 42. Consequently, pressure increase results in fluid tightness improvement at comparatively low temperatures in the order of −250° C. as well as at high temperatures in the order of +400° C. with peaks up to +600° C., or at any intermediate temperature.

The thrust exerted by the studs 49 on the washer 43a, 43b and the seating 42 need not be substantial and any jamming is prevented upon operation of the cock, even at high pressures.

It is obvious that the fluid tightness is reinforced and that the operation of the cock is facilitated owing to the thin polytetrafluoroethylene coating. The machining and mounting of the control shaft become simplified.

Figure 3:
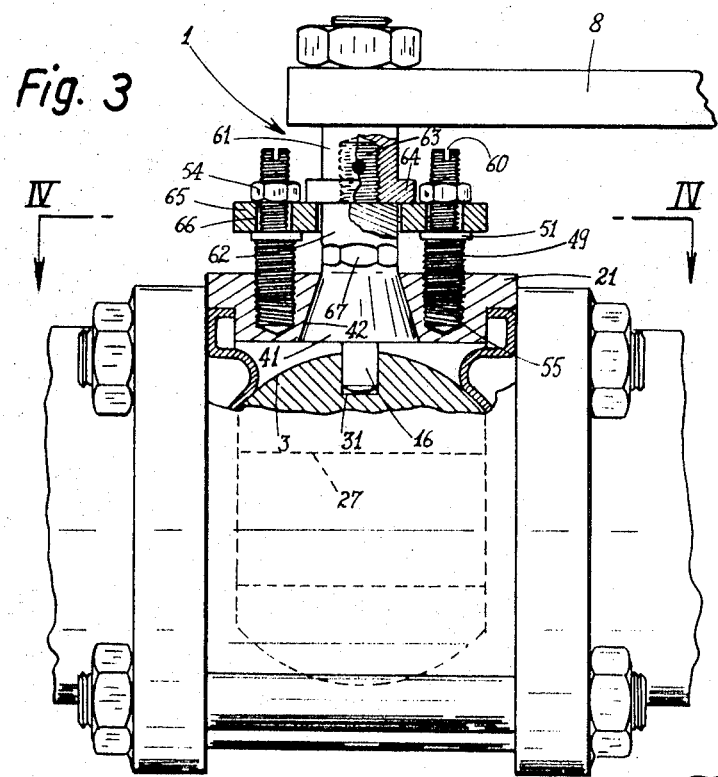
FIG. 3 is a view in partial axial section of a second embodiment of a cock according to the invention.
Figure 4:
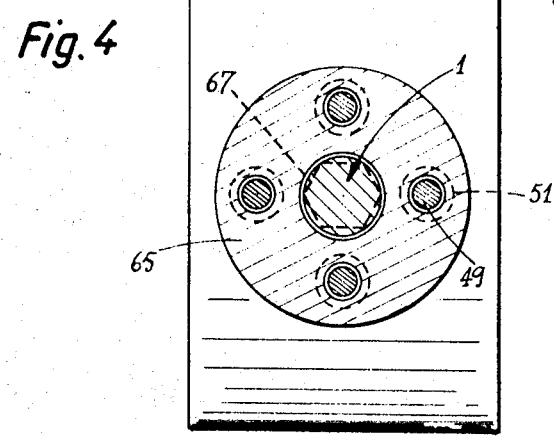
FIG. 4 is a view in section on line IV—IV of FIG. 3.

In the embodiment shown in FIGS. 3 and 4, the shaft 1 is constituted by two parts, namely a head 61 and a leg 62 terminating in a screw 63.

The head 61 carries the handle 8 and is formed with an annular projection 64.

The leg 62 is secured to the head 61 by screwing of the screw 63 into an axial bore in the head 61. Both parts 61 and 62 are interconnected by means of a screw or a spindle (not shown) subsequent to mounting. The leg 62 defines a frustoconical portion 41 and includes a driving lug 16. A hexagonal nut 67 is formed on the leg to facilitate the screwing of the latter into the head 61.

An annular tightening flange 65 encircles the leg 62 and is located between the body 21 and the annular projection 64 onto which the external surface of the flange bears. Adjustable studs 49 are screwed into bores 55 in the body 21 and are provided each with a ledge 51 and with a slot 61 intended for the screwing of the stud. These studs extend freely through the bores 66 in the flange 65.

Unscrewing of the studs 49 moves the flange 65 and the annular projection 64 away from the body 21, owing to the ledges 51, so that the enlarged portion 41 is applied against the seating 42.

When the pressure applied by the enlarged portion 41 on the seating 42 is deemed suitable, the studs 49 are locked onto the flange 65 by means of nuts 54. Here again the fluid pressure inside the cock tends to apply the enlarged portion 41 of the shaft against the seating 42 without the studs 49 need to exert a substantial thrust on the flange 65. The same advantages are available.

Figure 5:
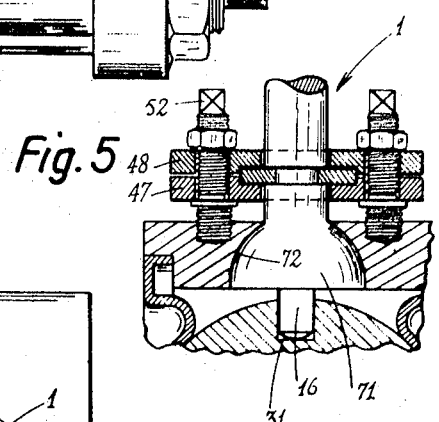
FIG. 5 is a detail of a modification of the embodiment shown in FIG. 1.

The embodiment shown in FIG. 5 is similar to that of FIG. 1, except that the enlarged portion 71 of the shaft and the seating 72 therefor are partly spherical.

I claim:

1. A cock comprising a body having a chamber therein, a rotatable plug accommodated within the chamber and having a passageway therethrough, a stem passing through an aperture in the wall of said body to control the angular position of said plug, said stem including an enlarged portion defining a first bearing surface engageable with a seating defined by said aperture in the body wall, and a tightening flange fixed onto said body in spaced relationship therewith to urge said first bearing surface into sealing engagement with said seating, said stem having a second bearing surface located outside said body and engaging said tightening flange, said enlarged portion of the stem being coated with a self-lubricating sealing material.

2. A cock as claimed in claim 1, wherein said control stem is constituted by two interconnected parts, said second bearing surface being defined by an annular projection integrally formed with one of these parts.

3. A cock as claimed in claim 1, said first bearing surface having a circular cross section which decreases towards the outside of said body.

4. A cock as claimed in claim 1, wherein said second bearing surface is defined by a friction washer constituted by two parts which are disposed in a groove in the stem and held by a counterflange secured to said tightening flange.

5. A cock as claimed in claim 4, wherein said tightening flange is kept by adjustable studs which are screwed into the body and also secure the counterflange to the tightening flange.